United States Patent [19]

Lambkin

[11] 4,232,260
[45] Nov. 4, 1980

[54] UNIVERSAL BATTERY CHARGER/ADAPTER UNIT

[76] Inventor: Fred M. Lambkin, 462 N. Morgan, Chicago, Ill. 60622

[21] Appl. No.: 897,938

[22] Filed: Apr. 19, 1978

[51] Int. Cl.³ .................. H01M 10/46; H01F 27/00
[52] U.S. Cl. .................................. 320/2; 336/107; 336/150; 339/31 M
[58] Field of Search ............................ 320/2–5, 320/6, 15, 16, 48, 22; 429/1, 9, 99, 100; 336/107, 137; 339/18 P, 31 R, 31 M

[56] References Cited

U.S. PATENT DOCUMENTS

| | | |
|---|---|---|
| 2,418,141 | 4/1947 | Salazar . |
| 2,649,493 | 8/1953 | Temple .......................... 320/16 UX |
| 2,920,260 | 1/1960 | Goffstein . |
| 3,034,000 | 5/1962 | Todd .............................. 336/150 X |
| 3,193,750 | 7/1965 | Chait . |
| 3,209,230 | 9/1965 | Mas . |
| 3,217,227 | 11/1965 | Sherwood . |
| 3,281,747 | 10/1966 | Winsand ............................... 336/137 |
| 3,579,075 | 5/1971 | Floyd . |
| 3,696,283 | 10/1972 | Ackley . |
| 3,735,232 | 5/1973 | Fister ........................................ 320/2 |
| 3,900,783 | 8/1975 | Herzog et al. . |
| 3,967,133 | 6/1976 | Bokern ................................... 320/2 X |
| 3,996,546 | 12/1976 | Hugly ..................................... 336/107 |
| 4,006,396 | 2/1977 | Bogut . |
| 4,009,429 | 2/1977 | Mullersman . |
| 4,096,428 | 6/1978 | Hanson et al. ........................ 351/1 X |

Primary Examiner—Robert J. Hickey
Attorney, Agent, or Firm—Hill, Van Santen, Steadman, Chiara & Simpson

[57] ABSTRACT

A universal battery charger/adapter unit is disclosed comprising a wall power unit and a separate cable which may be plugged into an appliance. The wall unit makes available different AC and DC voltages. A selected pluggable cable section is wired to selectively connect appropriate AC or DC voltages to the appliance being powered. The cable section has the further characteristic that current limiting or current regulating elements may be incorporated therein to improve the particular AC or DC voltage or current characteristics of the power unit with respect to that particular load. A battery nest can be permanently connected to a special bifurcated plug allowing the recharging of rechargeable AA, C or D size batteries in addition to 9 volt batteries. Interchangeable shims are used to compensate for various battery sizes.

4 Claims, 16 Drawing Figures

U.S. Patent  Nov. 4, 1980  Sheet 1 of 3  4,232,260
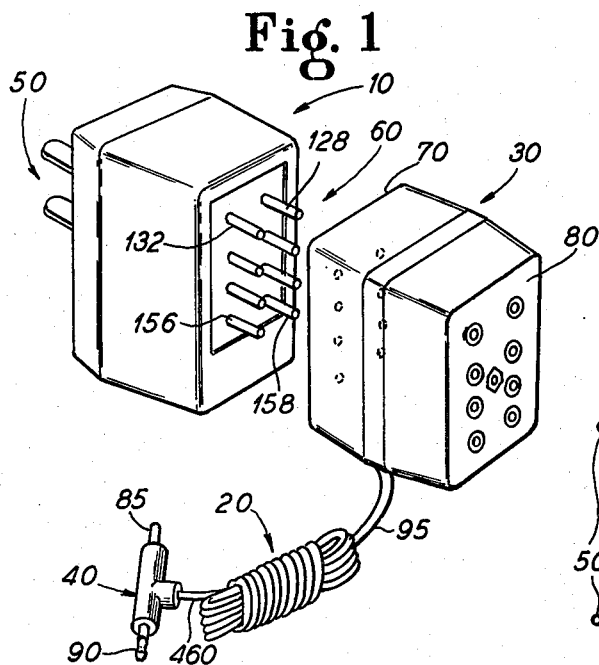
Fig. 1
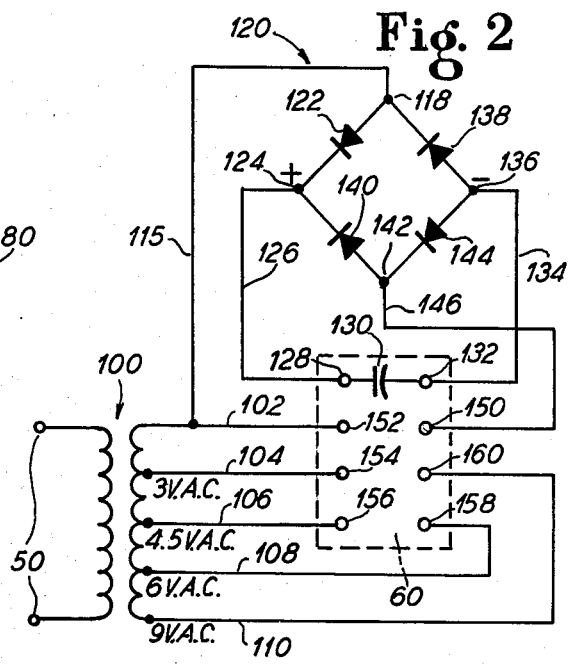
Fig. 2
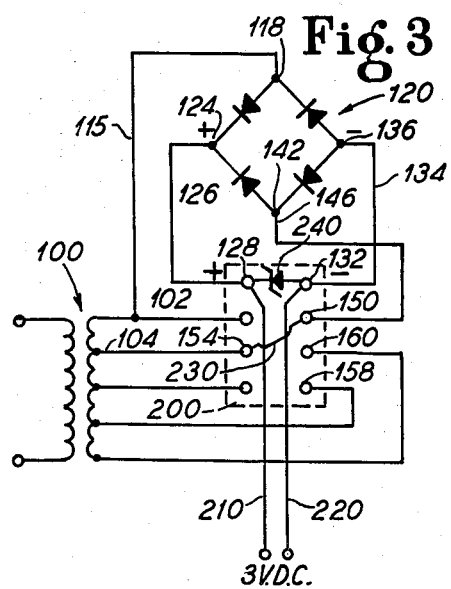
Fig. 3
Fig. 4    Fig. 5
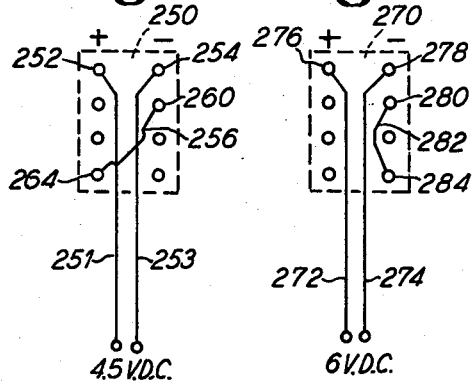
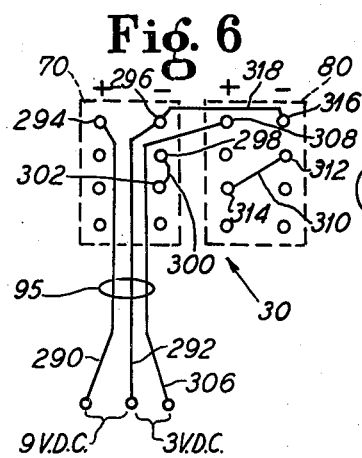
Fig. 6
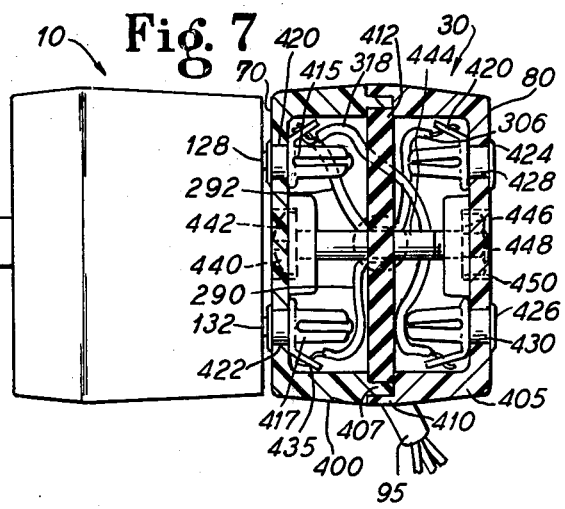
Fig. 7

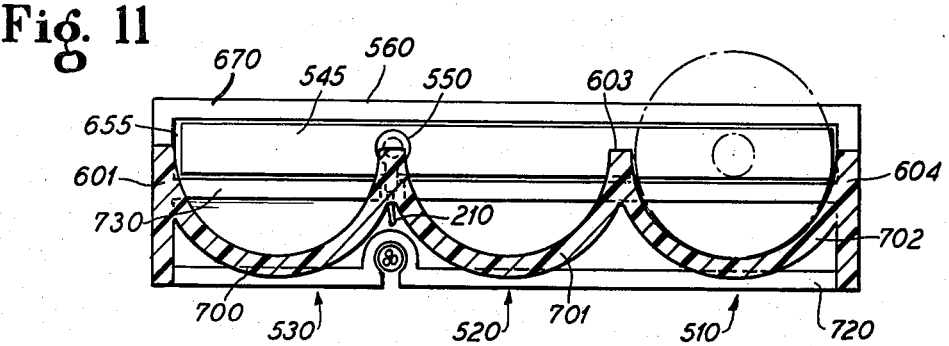
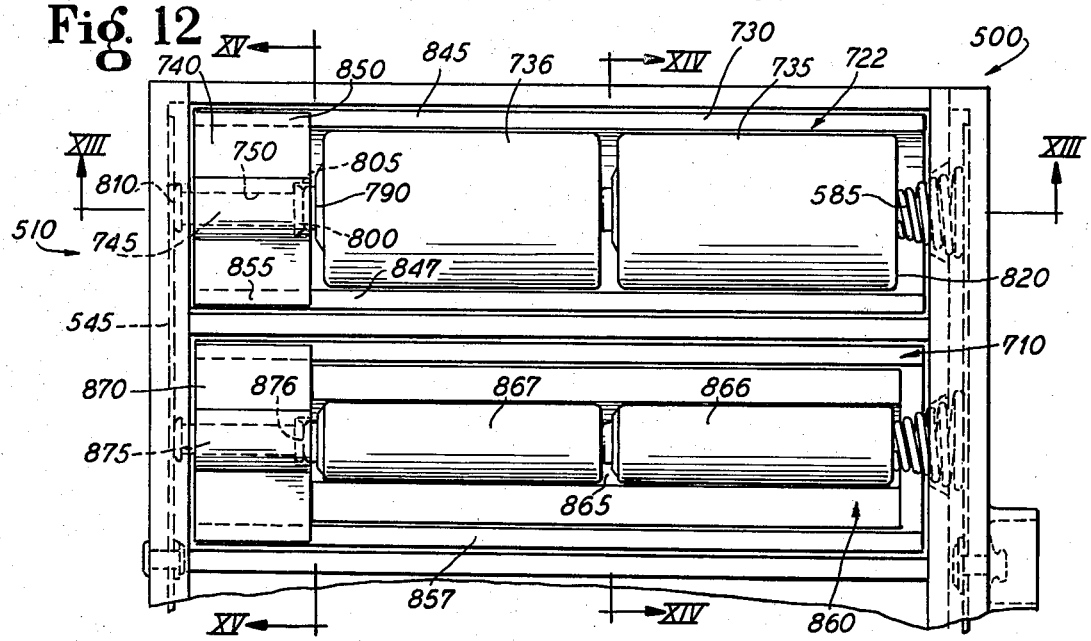
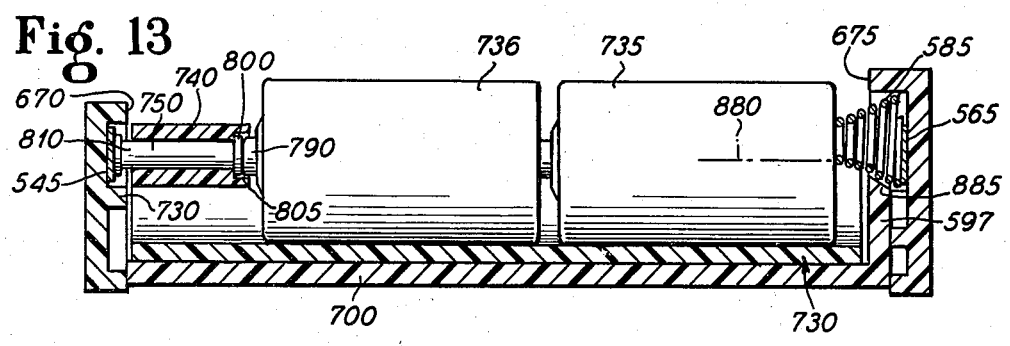
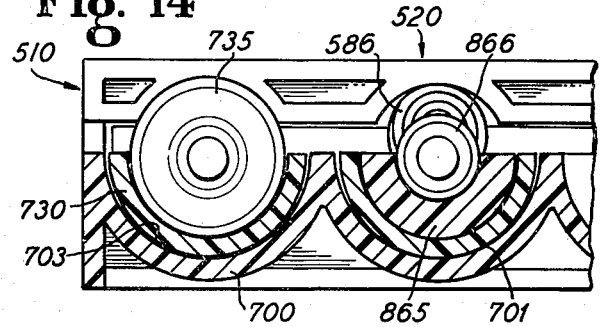
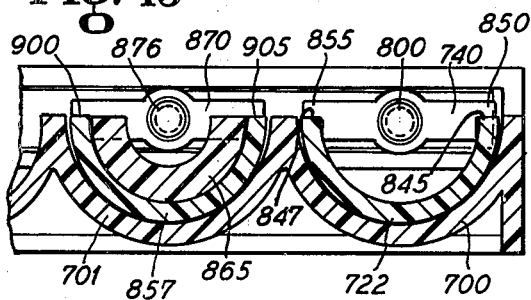

UNIVERSAL BATTERY CHARGER/ADAPTER UNIT

BACKGROUND OF THE INVENTION

1. Field of the Invention

The invention relates to the field of low wattage power units for use with small appliances, toys, or as a battery charger. In particular, the invention relates to a universal power module which by means of different connection cables can provide AC or DC power to a variety of small appliances.

2. The Prior Art

U.S. Pat. No. 3,217,227 discloses a battery charging box 10, operative to receive different sizes of battery by means of a base having various sizes of radii 84, 86, 88. The charging rates are established by use of lightbulbs 14, 20 having differing resistance characteristics. An adjustable contact 96 is used to compensate for differing battery lengths.

U.S. Pat. No. 3,900,783 discloses use of a selectively wired cable plug and socket 19, 23 to complete the connection between the rectified AC on lines 16, 47 and the battery 25.

U.S. Pat. No. 4,009,429 discloses a source of rectified AC 11, selectively connected to a battery block 13 through terminals 19, 21 and 23 on the power module 11 and terminals 25, 27, 29 on the battery block 13. Each battery block 12 is designed to handle a different size battery. Springs 64 of a conical shape act as electrical contacts and mechanically clamp the battery 44 to be charged into the battery box 13.

U.S. Pat. No. 3,696,283 discloses a battery charger wherein each different size battery has its own charging module 53, 55, 57, 59 or 61 plugged into a power module 51.

U.S. Pat. No. 3,209,230 discloses a multi-battery charging box 11. The support brackets 24, 25, FIG. 4, will accommodate different sizes of batteries. Springs 38, 48, 58 and 66 have a conical shape and in FIGS. 5, 6 are shown disposed so as to be aligned over the centers of the batteries to be rechargeable.

U.S. Pat. No. 3,579,075 discloses a battery box 10 with supports 28, 30 for various size batteries. Spring 26 loads contact structures 24a, 24b which are adjustable to accommodate differing size batteries.

U.S. Pat. No. 2,920,260 a battery charger and power inverter system.

U.S. Pat. No. 3,193,750 discloses a method of automatically altering the charging rates based on the voltage of the battery being charged.

U.S. Pat. No. 4,006,396 discloses adjusting charging rates automatically based on a sensing resistor attached to the sensing of the battery to be charged.

U.S. Pat. No. 2,418,141 discloses an adjustable battery holder with a sliding contact 21 which compensates for different length batteries.

SUMMARY OF THE INVENTION

The invention is a universal AC/DC power module with a generalized cable connection such that numerous small appliances of different current and voltage requirements may be driven from the same plug-in unit. The invention comprises in combination a wall power unit which converts standard line AC voltages to low voltage AC or DC available on a plurality of output points and a connecting cable. For each differing type of appliance such as calculator, electrical toy, or battery nest for rechargeable batteries, a special cable is supplied which plugs into the wall power unit. By means of the special cable, differing voltages and currents may be selected as required by the appliance, and there may be contained in the specialized cables current limiting elements, or voltage sensitive elements such as diodes which will prevent damage to the appliance being powered.

Where the appliance is a battery nest for rechargeable batteries, the specialized cable can be made an integral part of the nest such that the cable needs only to be plugged into the wall unit to provide appropriately selected power to the battery nest. to safely accommodate a variety of batteries being recharged, the battery nest cable may be provided with a two sided plug to select either low voltage nominally three volts, or higher voltage, nominally nine volts depending on the particular type of battery being charged. To accommodate the fact that rechargeable batteries come in sizes AA, C and D, interchangeable shims are provided such that sizes AA and C may be recharged in the same battery nest as recharge the D size batteries. The shims make up the physical differences between the physical dimensions of the AA or C and the D size batteries. The shims also may contain current limiting elements.

BRIEF DESCRIPTION OF THE FIGURES

FIG. 1 is an orthographic view of a wall unit with an associated cable and plug unit.

FIG. 2 is a schematic of the wall unit.

FIG. 3 is a schematic of the wall unit with the cable connection superimposed thereon for a three volt DC output.

FIG. 4 is a schematic of the cable connections for a four and one-half DC volt output.

FIG. 5 is a schematic of the cable connections for a six volt DC output.

FIG. 6 is a schematic for the double plug associated with the battery nest for nine volt and three volt DC outputs.

FIG. 7 is a section of the cable connector for the battery nest showing the relationship of the cable connector to the wall unit.

FIG. 11 is a section view taken along line XI—XI of FIG. 8 showing the recessed positive connection of the battery nest.

FIG. 12 is a partial, enlarged, top view of the battery nest charging C and AA size batteries.

FIG. 13 a section taken along line XIII—XIII of FIG. 12 shows the physical relationship between the C size batteries, the coil spring, and the shim for the positive terminal.

FIG. 14 a section taken along line XIV—XIV shows the relationship of AA or C size batteries to their respective shims.

FIG. 15 is a section taken along line XV—XV of FIG. 12 shows the relationship of the shims for the AA and C size batteries with respect to the positive terminal and battery nest.

DESCRIPTION OF THE PREFERRED EMBODIMENTS

Figure 8:
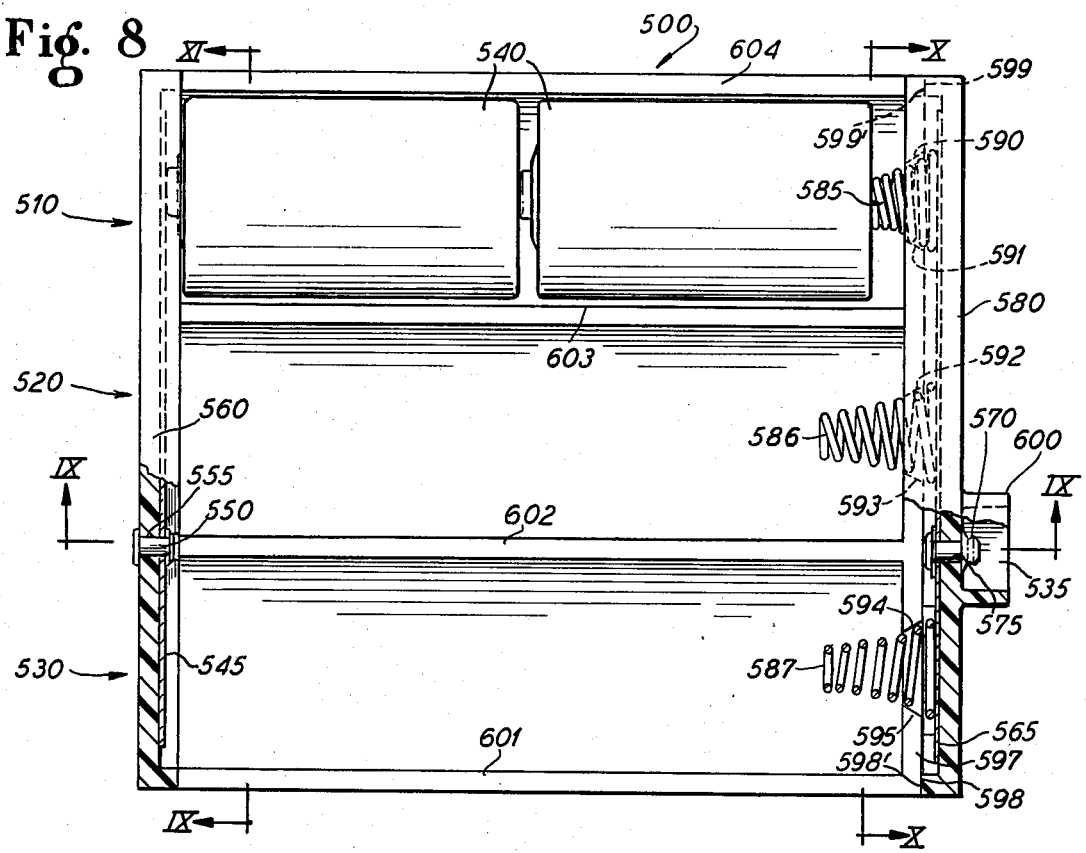
FIG. 8 is a top, partially fragmentary, planar view of the battery nest.

While the principles of the present invention find a particular utility in an AC/DC adapter charger unit, with a generalized cable structure, it will be understood that the arrangement of the present invention might be usable in other combinations as well. By way of exemplary disclosure of the best mode of practicing the invention there is shown generally in FIG. 1, a universal wall power unit 10, a cable unit 20 having a connector 30 adapted to plug into the wall unit 10 and a plug 40 which would be plugged into the load. The wall unit 10 has a standard AC wall plug 50 allowing the unit 10 to be plugged into the wall for power and a series of output pins 60 which supply low voltage AC or DC power suitable for use with various appliances. The cable 20, with the connector 30 is compatible with the output pin structure 60 of the wall unit 10. The connector 30 has a front socket structure 70 and a rear socket structure 80 providing two sets of output voltages on the plug 40 at pins 85 and 90 for cases where an appliance can utilize two differing output voltages in a mutually exclusive fashion. The connector 30 is connected to the plug 40 by a wire or series of wires 95. It should be noted that the pin structure 60 on the wall unit 10 could be replaced with a series of low voltage connector plugs if it were desirable that the wall unit not display any active pins. In such a case the connector 30 would be replaced with a compatible pin unit.

FIG. 2 discloses a schematic of the wall unit 10 of a very conventional variety. A transformer 100 having a multiply tapped secondary with a group of windings 102, 104, 106, 108 and 110 is connected by the lead 102 to a wire 115 then to an input point 118 of a bridge rectifier 120 in a known fashion. The input point 118 is connected through a diode 122 to a positive DC output terminal 124 of the bridge rectifier 120. The output terminal 124 is connected by a line 126 to a pin 128. The pin 128 is connected by a filter capacitor 130 to a pin 132. The pin 132 is connected by a line 134 to a negative output point 136 of the bridge rectifier 20. The point 136 is connected through a diode 138 to the AC input 118. A diode 140 connects the positive DC output point 124 to a second AC input point 142. The bridge rectifier 20 is completed by a diode 144 connecting the negative DC output point 136 to the second AC input point 142. A lead 146 connects the second AC input point 142 to a pin 150. The secondary leads 102, 104, 106, 108, 110 are connected to a set of pins 152, 154, 156, 158, 160 on the structure 60.

Any low voltage multiple tap secondary transformer may be used for the transformer 100 so long as its output wattage is adequate to service the load appliance. The bridge rectifier 120 is of a conventional variety, whose diodes 122, 138, 140, 144, have a current limit which is compatible with the maximum wattage to be drawn from the wall unit 10. The filter capacitor 130 is of the size conventionally used for low voltage filter applications where precise regulation is not required. The interconnections between the secondary outputs 102-110 of the transformer 100 and the bridge rectifier 120 are of the conventional and known fashion. The output pin structure 60 allows one to connect various secondary leads 104, 106, 108, 110 to the second AC input point 142 of the bridge rectifier 120 by means of the pin 150.

The other input 118 to the bridge rectifier 120 always comes from the fixed end 102 of the transformer 100 on the line 115. The second input to the bridge rectifier 120 is selected through the plug structure 60 from the available secondaries 104, 106, 108, 110 of the transformer 100 to provide the appropriate output voltage. The connection between the line 146 and the secondary winding 104, 106, 108, 110 of the transformer 100 is made through the connector 30 of the cable unit 20. Thus as may be seen, by means of altering cable units 20, differing output voltages may be supplied to meet the various needs of sorted appliances.

FIG. 3 is a schematic showing the same transformer 100 with the bridge rectifier 120 as is indicated in FIG. 2. Additionally, the connections required in any connector unit to be plugged into the pins 60 such as a connector unit 200 are indicated which are required to produce a three volt direct current output voltage for an appliance to be powered. The connector 200 makes a connection at the pin 128 to an output line 210 to produce the positive DC output voltage. The negative DC output voltage is produced on a line 220 through the pin 132 which is connected through the line 134 to the negative output point 136 of the bridge rectifier 120. A lead 230 connects the pins 150 and 154 thereby connecting the secondary top 104 to the second AC input point 142 of the bridge rectifier 120. The bridge rectifier 120 now has AC power applied to the input points 118, 142 and will supply DC to the output points 124, 136. The lines 126 and 134 bring the DC to the pins 128 and 132. A zener diode 240 is connected across pins 128 and 132 to improve output regulation if desired. The zener diode 240, the leads 210 and 220 and the leads 230 all are housed in the connector 200 which is plugged into the output pins 60.

FIG. 4 shows the schematic of a connector 250 wired to connect the power module 10 so as to produce a 4.5 volt DC output. The plugs of the connection block 250 mate with the pins 60. As with respect to FIG. 3, a positive DC voltage is output on a line 251 which is connected to a point 252 and a negative DC voltage is output on a line 253 which is connected to a point 254. The internal connections in the module 10 remain the same. A jumper 256 is connected between a point 260 and a point 264. When the connector 250 is plugged into the pins 60, four and one-half volts DC, approximately, is available on the lines 251, 253. The connection points 252, 254, 260 and 264 of the connector 250 mate with the pins 128, 132, 150 and 156 of the output pin structure 60.

FIG. 5 illustrates the connections in a connector 270 to produce a 6 volt DC output on a pair of lines 272, 274. A positive DC voltage is brought out on the line 272 connected to a point 276. A negative DC voltage is brought out on the line 274 connected to a point 278. A point 280 is connected by a jumper 282 to a point 284. When the connector 270 is plugged into the output pin structure 60, the points 276, 278, 280 and 284 mate with the pins 128, 132, 150 and 158 respectively which results in supplying six volts DC, approximately, to the output lines 272, 274.

FIG. 6 shows the composite two sided connector 30 having sides 70 and 80 with the necessary jumpers in the connector 30 to produce the required output voltages. With respect to side 70, a positive 9 volt DC voltage is brought out on a pair of lines 290, 292 which connect to the points 294, 296 which correspond to the positive and negative output pins 128, 132. A point 298 is connected by a jumper 300 to a point 302. When the side 70 of the connector 30 is plugged into the output pin structure 60, the points 294, 296, 298 and 302 mate with the pins 128, 132, 150, 160 resulting in a 9 volt DC output, approximately, appearing on the lines 290, 292. With respect to side 80, three volts DC is supplied on a pair of wires composed of the wire 292 and a wire 306. The wire 306 is connected to a point 308. A connector 310 joins a pair of points 312, 314. A point 316 is connected by a line 318 to the point 296.

FIG. 7 discloses the relationship between the wall unit 10 and the connector 30. The connector 30 has a housing with a left part 400 and a right part 405. The two halves 400, 405 interlock by means of a pair of lips 407, 410. An insulating barrier 412 isolates the left and right half 400 and 405 from one another. A pair of plugs 415, 417 are mounted through a pair of body holes 420, 422 in the face 70 which are plugged into the pair of output pins 128, 132. On the face 80, a pair of plugs 424, 426 is mounted through a pair of body holes 428, 430. The plug 415 corresponds to the connection point 296 of FIG. 6. The plug 417 corresponds to the connection point 294 of FIG. 6. Similarly, the plugs 424, 426 correspond to the connection points 308 and 316 of FIG. 6. The connections to the plugs 415, 417, 424, 426 are made as for example at a tab 435 of plug 417 by crimping or soldering. The left and right halves 400, 405 of the housing are held together by a screw 440 which passes through the face 70 at a hole 442, through a spacer 444, through a hole 446 in the face 80 and is locked by a nut 448 in a slot 450. The cable 95 is brought into the connector 30 in conventional fashion.

As noted previously, the cable unit 20 is suitable in various forms by means of different internal jumper connections to provide assorted load voltages to differing appliances. It should be noted, that the plug 30 may be jumpered appropriately so as to provide low voltage AC on the cable 95 as well as the rectified DC. These voltages are supplied as needed through a compatible plug of the type 40 which is suitable for use with the appliance in question. One common use for low voltage DC wall units is to recharge nickle cadmium rechargeable batteries. To this end, the bifurcated plug unit 30 may be permanently attached at an end 460 of the cable 95 directly to a battery nest without the plug 40. One of two charging voltages may be selected depending on whether the plugs on the face 70 or the plugs on the face 80 are connected to the pins 60 of the unit 10.

FIG. 8 discloses a battery unit compatible with the bifurcated plug unit 30. In FIG. 8, a battery nest 500 is shown having a group of three bays 510, 520 and 530 usable for interchangeably charging AA, C or D size batteries, as well as a bay 535 for use when charging 9 volt batteries. Each of the regions 510, 520, 530 is semicircular in cross-section and has a length adequate to allow a pair of D size batteries 540 to be inserted in series. A positive contact 545 provides a common electrode for the anodes of all of the batteries being charged. As may be seen from the battery nest 500, a total of six D size batteries may be charged simultaneously. Electrical contact is established between the cable 95 containing the lead 306 with the positive potential of DC voltage and the common electrical contact 545 in the battery box 500 by means of a rivet 550 installed through a boring 555 through a wall 560 of the battery nest 500. The rivet 550 is effective to clamp the electrode 545 to the lead 306 containing the positive DC thereby establishing electrical contact. Negative electrical contact is established through an electrode 565, common to all of the cathodes and a second rivet 570 which passes through a boring 575 in a wall 580 of the battery nest 500. The common line 292 in the cable 95 is connected by the rivet 570 to the common cathode electrode 565. A set of three cathode springs 585, 586, 587 is held in electrical contact with the common electrode 565 by three pairs of tapered surfaces 590, 591, 592, 593, 594, 595. The tapered surfaces 590-595 hold the cathode springs 585, 586, 587 in contact with the electrode 560 without the need of additional mechanical mounting fixtures and are mounted in a rear interior wall 597. The interior wall 597 is connected to the exterior wall 580 at a pair of surfaces 598, 599 on the wall 597 that match a pair of surfaces 598' and 599' on the exterior wall 580. The auxiliary charging region 535 for use with 9 volt batteries has a housing 600 whose purpose is to protect the electrical contacts residing therein, among them the electrode 570 which serves as a common ground for the three volt and nine volt charging systems and provides some stability for a 9 volt battery plugged into the charging section 535. The interior rear wall 597 is connected to a group of perpendicular walls 601, 602, 603, 604, which are in turn connected to the front wall 560.

Figure 9:
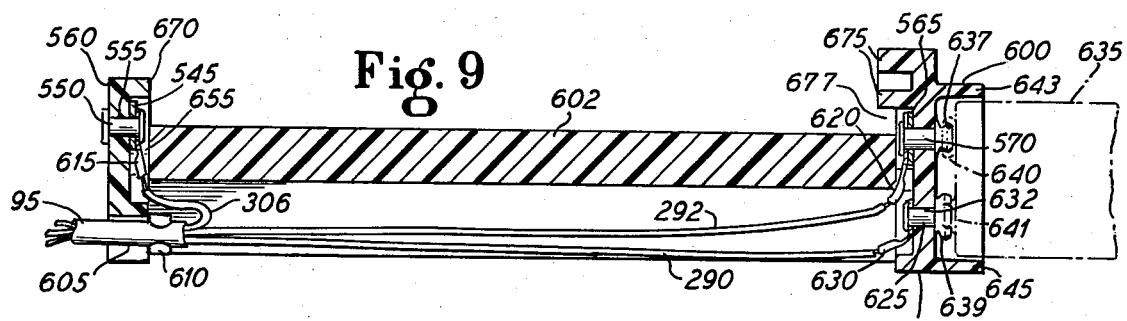
FIG. 9 is a section taken along line IX—IX of FIG. 8 of the battery nest showing the electrical connections thereto.

FIG. 9, a section taken along line IX—IX discloses the electro-mechanical relationship between the rivets 550 and 570 and the body of the battery nest 500. The cable 95 is brought into the battery nest 500 through a boring 605 through the wall 560. A strain relief 610 is mounted against the wall 560 to protect the cable and the lead 306 is brought to the rivet 550 through a termination 615. Similarly, the lead 292 is brought to the rivet 570 through a termination 620. The 9 volt lead 290 is brought to a rivet 625 through a termination 630. The rivet 625 passes through a body hole 632 in the wall 580. The two rivets 570 and 625 also serve as the contact point where a 9 volt battery 635 is plugged for recharging purposes. The rivets 570 and 625 each have a head, 637, 639, which match one of two connections 640, 641 on the 9 volt battery 635 to be recharged. The housing 600 has a top wall 643 and a bottom wall 645 to isolate the two contacts 570 and 625 from the exterior environment and to provide support for the 9 volt battery 635. The intervening wall 602 is shown in section between the two charging regions 520 and 530. From FIG. 9 it may be seen that the positive electrode 545 is in a recess 655 with an overhang 670 which is operative to prevent the batteries from being put in backwards and making contact with the positive terminal 545. FIG. 9 also shows a portion of the housing 675 at the cathode end of the battery nest. The housing 675 forms the upper portion of a slot 677 wherein the cathode electrode 565 is positioned.

Figure 10:
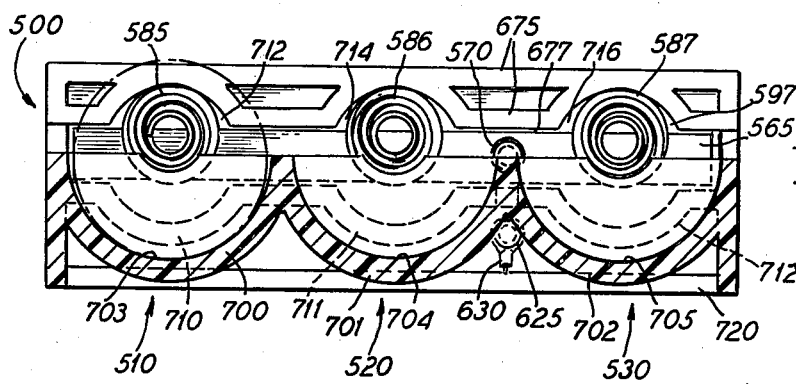
FIG. 10 is a section taken along line X—X of FIG. 8 showing the detail of the compression springs in the battery nest.

FIG. 10 a section taken along line X—X of FIG. 8 shows the detail of the cathode electrode and of the battery nest 500 with the conical cathode springs 585-587 mounted therein. The conical cathode springs 585-587 are retained entirely by the tapered surface 590-595 in the wall 597 at the end of the battery nest 500 in conjunction with the housing 675. As can be seen from FIG. 10, each of the conical springs 585-587 makes electrical contact with the common electrode 565, which resides in the slot 677. The rivet 570 provides the DC ground to the charging system. Behind and above the wall 597 is the retaining structure 675 which keeps the conical cathode springs 585-587 in position vertically. As can be seen, in each of the regions 510, 520 and 530 a semicircular section 700–702 provides a base upon which the batteries to be charged, or the inserts to be discussed later may be placed. The group of semicircular regions 700–702 represents sections with a set of surfaces 703–705 whereon a D size battery rests when charging. A group of semicircular regions 710–712 in the charging regions 510, 520 and 530 represents a flange between the interior wall 597 and the exterior wall 580. Note that the electrode 565 could be given a circular shape in a set of regions 712, 714, 716 directly behind the springs 585, 586 and 587 to improve electrical contact between the electrode 565 and the springs 585, 586 and 587. A bottom 720 closes the nest 500.

FIG. 11, a section taken along line XI—XI of FIG. 8 discloses the detail of the anode end of the battery nest 500. The common anode electrode 545 may be seen connected to the rivet 550 which in turn provides electrical contact with the lead 210 bringing in the 3 volt DC to the battery nest and retains the electrode 545 in the slot 655. The overhang 670 along with a lower ridge 730 provide failsafe protection with respect to the electrode 545 so the cathode end of a battery put in backwards will not make contact with the positive electrode 545.

FIG. 12 discloses the use of the battery nest 500 to charge AA and C size batteries with the use of removable shims. For the purpose of charging C size batteries, a semicircular shim 722 is used. The shim 722 has a body portion 730 whose purpose is to compensate for the reduced diameter of the C size batteries 735, 736 with respect to the D size batteries for which no shims are necessary. The shim 722 rests with the lower surface of the body 730 on the surface 703. The shim 722 in addition has a separate header portion 740 whose purpose is to compensate for the difference in length of two series C size batteries 735, 736 as opposed to two series D size batteries. The shim 740 has a contact 745 through a body hole 750 which provides electrical contact between the positive electrode 545 and an anode 790 of the C size battery 736. It should be noted that the contact 745 has a recessed end 800 in a slot 805 whose purpose is to serve to insure that a C size battery 736 inserted backwards will not make contact with the common anode 545. It should also be noted that the electrode 745 has a protruding end 810 which mates with the common anode electrode 545. In FIG. 12 the cathode end 820 of the C size battery 735 making contact with the conical springs 585 still makes direct contact with that spring even though a C size battery is involved. The shim 740 is supported on a pair of surfaces 845, 847 on the body 730. A pair of tabs 850, 855 integral to the shim 740 rests on the surfaces 845, 847.

To charge an AA size battery, a shim 857 identical to the shim 722 associated with charging the C size batteries is first inserted into an appropriate region 510, 520 and 530 of the battery nest 500 followed by a shim 860 specifically designed to compensate for the smaller size of AA batteries. The shim 860 has a body region 865 whose purpose is to compensate for the change in diameter of a pair of AA size batteries 866, 867 as opposed to the C size battery. The shim 860 is used in conjunction with a header shim 870 identical to the shim 740 which is used with the C size battery. The shim 870 has a connecting electrode 875 with a contact surface 876 which is identical to the electrode 745.

FIG. 13 a section taken along line XIII—XIII of FIG. 2 discloses the relationship between the shim 740 and the C size battery 736 being charged. As can be seen from FIG. 13, the contact 750 extends between the anode electrode 545 and the anode 790 of the C size battery 736 being charged. Further, the header shim 740 has the slot 805 associated with end 800 of the electrode 780 to protect the electrode 545 from the cathode end of a battery inserted backwards into the battery nest 500. FIG. 13 also discloses that the conical cathode spring 585–587 are mounted in the wall 597 of the battery nest 500 and are mounted above the center line 880 of any of the batteries AA, C or D size to be charged. This off center mounting serves to bias the batteries down into the battery nest and hold them more firmly in place for purposes of charging. A biased surface 885 in the wall 597 tends to force the spring 585 upward. As a result, the batteries 735, 736 not only compress the spring 585 but they also force it downward against the surface 585.

FIG. 14, a section taken along line XIV—XIV, discloses the relationship between the C size battery 735 and the AA size battery 866 and their respective shims. The base curvature of the member 700 with the surface 703 is utilized when charging the D size batteries. The member 700 supports the body 730 of the shim 722 required for purposes of charging C size batteries. On top of the body 730 is placed the shim 865 which is utilized for charging the AA size batteries. The off center mounting of the conical springs 585–587 can clearly be seen with respect to the AA size battery 866.

FIG. 15, a section taken along line XV—XV, discloses the physical relationship of the shims for the C and AA size batteries with respect to the header shims. The header shim 740 rests on the surfaces 845–847 of the body 730 of the shim 722. The shim 870 rests on a pair of surfaces 900, 905 of the shim 857. The AA size shim 865 rests on the C size shim 857 which rests on the curved member 701. On the body 857 rests the shim 865 for use with the AA size batteries.

Figure 16:
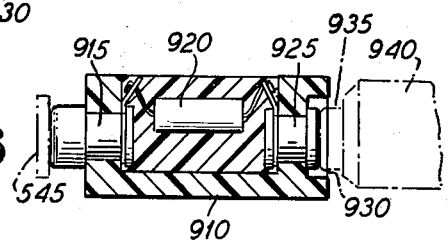
FIG. 16 is a planar section of an alternate shim with a current limiting element.

When utilizing the common shims 740 and 870 for both the C and AA size batteries some consideration must be given to the charging rate. The recommended charging rate for the AA size batteries is 50 milliamperes. When the common shims 740 and 870 are being used, the output from the 3 volt DC circuitry of the wall unit 10 should be limited to 50 milliamperes. An alternate embodiment of the shim 870 utilizing a current limiting resistor therein specifically designed for use with the AA size batteries could readily be implemented as shown in FIG. 16. A header shim 910 is shown in section with a contact 915 operable to engage the anode 545, a current limiting resistor 920 and a battery contact 925 in a slot 930 which can engage the anode 935 of an AA size battery 940. The resistor 920 could be encapsulated with the shim 910 to make a mechanically rugged unit. This would permit a user to charge the C and D size batteries at a higher rate than is possible if the same rate is to be used for all batteries.

It should be noted that the connection member 30 functions as an enabling means to apply a selected AC voltage from a selected pair of secondary terminals 102–110 of the transformer 100 to the conversion or rectification means 120 and also to apply a selected output voltage and current to the transmission cable 95 for delivery to a load through connection 85 or 90.

Although various modifications might be suggested by those skilled in the art, it should be understood that I wish to embody within the scope of the patent warranted hereon all such modifications as reasonably and properly come within the scope of my contribution of the art.

I claim as my invention:

1. An improved power unit which includes a transformer with a secondary having multiple taps, a rectifier means and a first one-half of a connector having a plurality of pins, the secondary taps are connected to selected pins on the one-half of a connector, the improvement comprising:

an input terminal and output terminals for the rectifier means are connected to other pins on the first one-half of a connector;

a second one-half of a connector having a plurality of plugs is connected to an output cable and selected plugs of said second one-half of a connector are connected together so that when the two parts of the connector are plugged together a selected secondary terminal of the transformer is connected to the input terminal of the rectifying means and the output terminals of the rectifying means are connected to the output cable.

2. In a power supply module containing a transformer with a secondary that has a series of voltage taps, and a means for rectification with a pair of input terminals and a pair of output terminals, an improvement comprising:

a two-part means for connection and a low voltage power cable;

a first part of said means for connection is attached to the power supply module and includes a first selectively arranged plurality of contacts;

the members of the series of voltage taps on the secondary of the transformer are connected to selected members of said first plurality of contacts;

at least one input terminal and the output terminals of the means for rectification are connected to other selected members of said first plurality of contacts such that power is not supplied from the transformer to the means for rectification;

a second part of said means for connection includes a second selectively arranged plurality of contacts:

selected members of said second plurality of contacts are electrically shorted together and form a first group, the output power cable is connected to a second group of other selected members of said second plurality of contacts;

said first and second parts of said means for connection are adapted to be plugged together;

when said first and second parts of said two part means for connection are plugged together, members of said first plurality of contacts electrically engage members of said second plurality of contacts whereby said first group of contacts electrically connects a selected transformer secondary tap to the input terminal of said means for rectification thereby permitting power to be applied by the transformer to the means for rectification; and said second group of contacts electrically connects the output terminals of said means for rectification to the output power cable, thereby permitting low voltage power to be applied by the means for rectification to the output cable.

3. A universal battery charger adapter unit comprising:

a power unit;

said power unit having an input port for electrical power and a plurality of output means for electrical power;

said power unit containing a means for electrical conversion operably connected to said input port and said plurality of output means so as to provide a plurality of output voltages, a selected one of which is applied to a member of said plurality of output means, when a selected voltage is applied to said input port;

a means for electrical connection including a cable for transmission of electrical energy;

said cable being connectable at a first end to said plurality of output means as well as connected at a second end to a battery nest for charging rechargeable batteries and operable to connect selected members of said plurality of output means so as to apply a selected output voltage to said battery nest;

said battery nest having means whereby a plurality of variable size batteries may be simultaneously charged;

said means whereby a plurality of variable size batteries may be simultaneously charged comprising at least one shim insertable into said battery nest and operable to compensate for the varying physical dimensions of a corresponding member of the plurality of variable size batteries being charged; and wherein said shim includes an electrical means operable to limit the charging rate of a corresponding member of the plurality of variable size batteries being charged.

4. A universal battery charger adapter unit comprising:

a power module;

means for electrical connection;

said power module having input means and a plurality of output terminals;

said power module containing an electrical means, for converting electrical energy, connected to said input means and said plurality of output terminals;

said electrical means for converting electrical energy being operable to convert voltage applied to said input means to a plurality of output voltages, a selected one of which is applied to a member of said plurality of output terminals;

said means for connection being operable to connect a selected subset of said members of said plurality of output terminals to a battery nest and to modify the selected output voltage before applying it to said battery nest;

said battery nest having means whereby a plurality of variable size batteries may be charged;

said means whereby a plurality of variable size batteries may be charged comprising means for shimming insertable into said battery nest and operable to compensate for the varying physical dimensions of a corresponding member of the plurality of variable size batteries charged; and wherein said means for shimming includes electrical means operable to limit the charging rate of the corresponding member of the plurality of variable size batteries being charged.

* * * * *